Patented Dec. 7, 1937

2,101,373

UNITED STATES PATENT OFFICE 2,101,373

PARASITICIDAL SPRAY COMPOUND

Frank F. Lindstaedt, Oakland, Calif.

No Drawing. Application June 13, 1934,
Serial No. 730,469

4 Claims. (Cl. 167—27)

The invention relates to an oil compound arranged for use with a water carrier to provide a spray for parasiticidal purposes. More particularly the compound is of the type calculated to effect killing of the parasites not alone by chemical reaction therewith but by mechanical action, such as smothering or asphyxiation.

It is well known that certain spray oils such as hydrocarbon oils are quite volatile, particularly when of relatively low viscosity. For this reason, as well as because of its relatively low cost, hydrocarbon oil is in more or less general use as a spray oil. It has been found however that due to its extreme activity, the hydrocarbon oil when deposited on the surface of a plant or the like, readily and quickly penetrates deeply into the pores of the plant and, as a result, considerable injury may be done to the plant. In view of the foregoing, the amount of the hydrocarbon oil in the ordinary spray compositions is reduced to a point rendering the oil safe for the plants but this of course proportionally reduces the percentage of kill per application of spray.

I have found that by mixing the hydrocarbon oil with a substance having a readiness to polymerize when exposed to air, and at the same time having an affinity for the oil, the foregoing disadvantages in the use of the hydrocarbon oil are practically entirely eliminated. It appears that when such substance is mixed with the oil and sprayed upon the plant, the substance quickly forms a film of jell or sponge-like structure on the applied surface, and owing to the affinity of the oil for the substance, the latter holds the hydrocarbon oil practically entirely at the surface of the plant so that the oil will be caused to expend its parasiticidal energy not in the pores of the plant but at the surface where the parasital scale is concentrated. I have found that the most effective substances aforesaid for use with the oil are the oil derivatives of species of the Spurge or Euphorbiaceae family. The particular species desirable are the *Aleurites fordii*, *Aleurites montana*, and *Aleurites cordata*. Of the derivatives I have found tung oil or, as it is frequently termed, China-wood oil to be most satisfactory. In fact so effective is the tung oil that a kill of almost one hundred per-cent of red scale may be accomplished by the use of but one per cent of the oil in hydrocarbon oil and with the tung and hydrocarbon oil content in the aqueous carrier as low as one half of one per cent.

It is to be noted that while the tung oil is at present more costly than the hydrocarbon oil, the proportion of its content in the compound is exceedingly small and its presence in preventing the destructive penetration of the hydrocarbon oil into the plant, and at the same time insuring a so much greater kill, more than makes up for its added cost.

In practice I have found that for obtaining close to a one hundred per cent kill of plant surface parasites, ranging from the weakest to most resistant of scales, the use of from one to five per cent of the tung oil in hydrocarbon oil of approximately from forty-five to sixty Saybolt viscosity is sufficient when such composition is used in the proportion of from one half of one per cent to two and one-half per cent in the aqueous carrier. By way of comparison it may be pointed out that under equal conditions, tests made with such hydrocarbon oil alone gave a kill of but forty-seven per cent.

I claim:

1. A horticultural spray compound, comprising a mixture of hydrocarbon oil and tung oil in a proportion effective to retard penetration of the hydrocarbon oil into the pores of plants and the like when the mixture is deposited on the surface thereof.

2. A horticultural spray compound comprising a mixture of relatively low viscosity hydrocarbon oil and tung oil in the proportion of approximately from one to five per cent by weight of the tung oil in the hydrocarbon oil.

3. A horticultural spray compound comprising a mixture of relatively low viscosity hydrocarbon oil, tung oil, and an aqueous carrier, in the approximate proportions by weight of from one-half of one per cent to two and one-half per-cent of the tung oil in the hydrocarbon oil and from one to five per cent content of the oil mixture in the carrier.

4. A parasiticidal horticultural spray compound comprising a mixture of hydrocarbon oil and a sufficient amount of tung oil to retard during the entire active period of the hydrocarbon oil a substantial penetration of said hydrocarbon oil into a porous subject when the mixture is deposited thereon.

FRANK F. LINDSTAEDT.